(No Model.)  4 Sheets—Sheet 1.
H. MOORE.
VEHICLE WHEEL.
No. 504,440.  Patented Sept. 5, 1893.
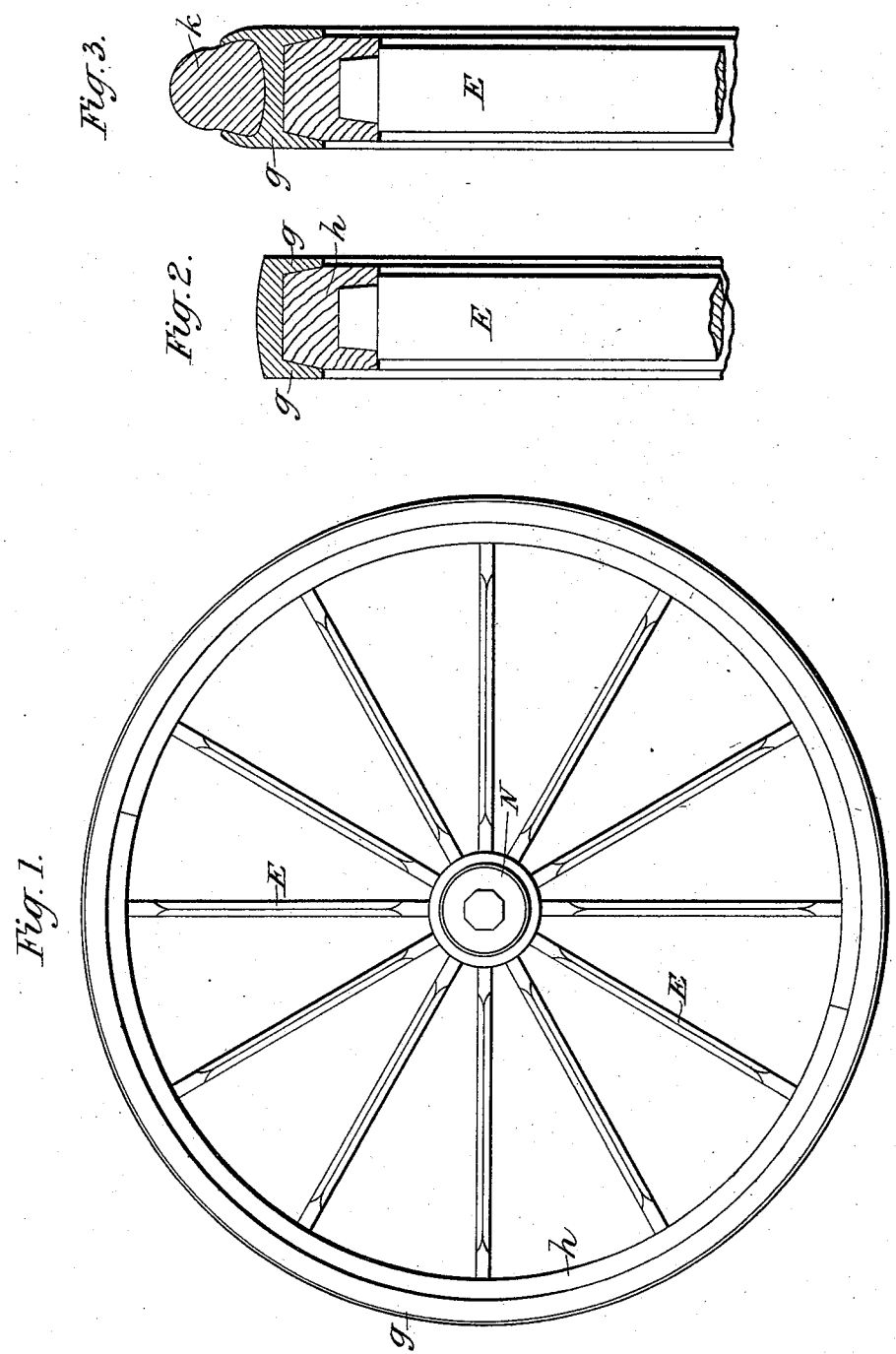
Witnesses.
D. H. Sweeney
A. Jones.
Inventor:
Harry Moore
by H. Moy Thomas
his attorney (No Model.) 4 Sheets—Sheet 2.
H. MOORE.
VEHICLE WHEEL.
No. 504,440. Patented Sept. 5, 1893.
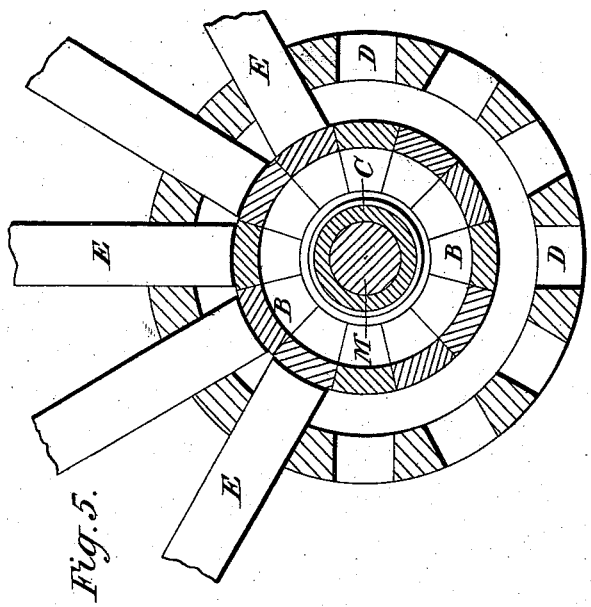
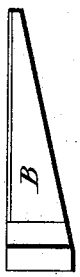
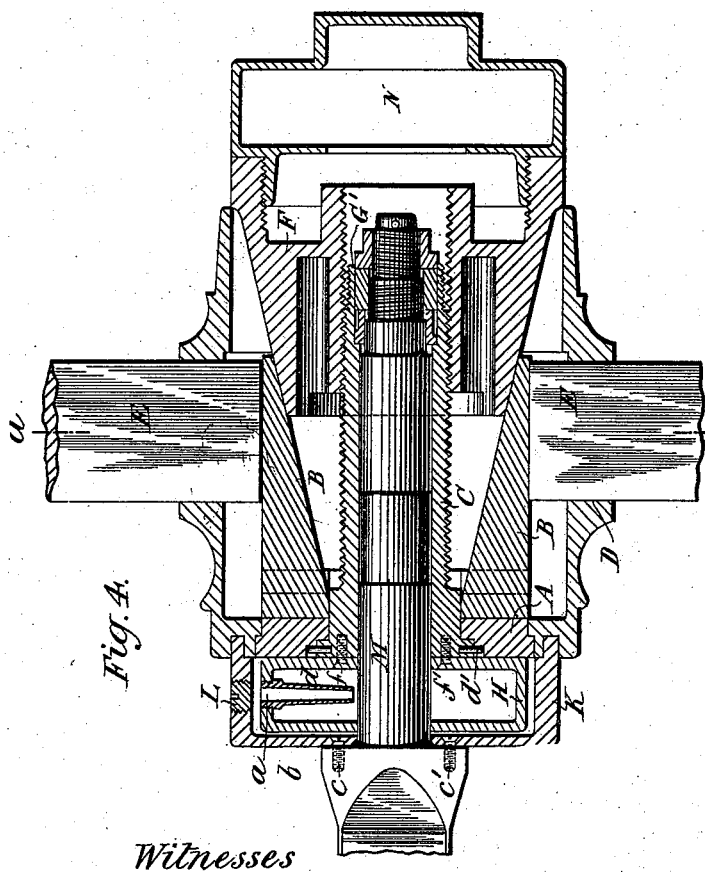
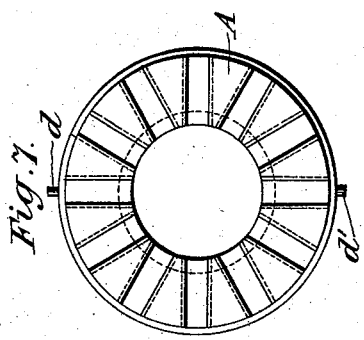
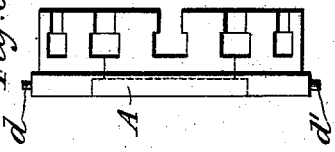
Witnesses
D. H. Sweeney
A. Jones.
Inventor:
Harvey Moore
by H. Moy Thomas
his attorney.

(No Model.) 4 Sheets—Sheet 3.

H. MOORE.
VEHICLE WHEEL.

No. 504,440. Patented Sept. 5, 1893.

Witnesses.
D. H. Sweeney
A. Jones.

Inventor.
Harvey Moore
by H. M. Thomas
his attorney.

(No Model.) 4 Sheets—Sheet 4.
H. MOORE.
VEHICLE WHEEL.
No. 504,440. Patented Sept. 5, 1893.
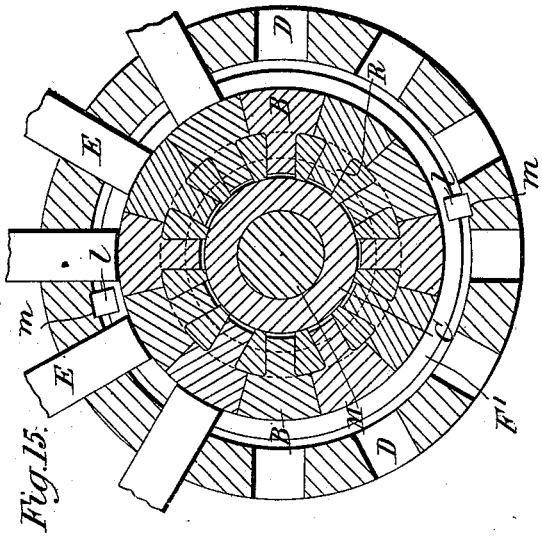
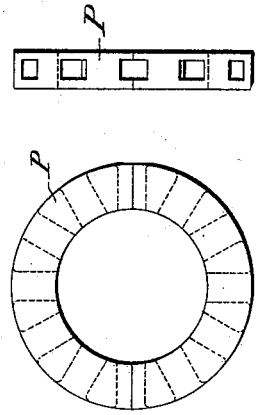
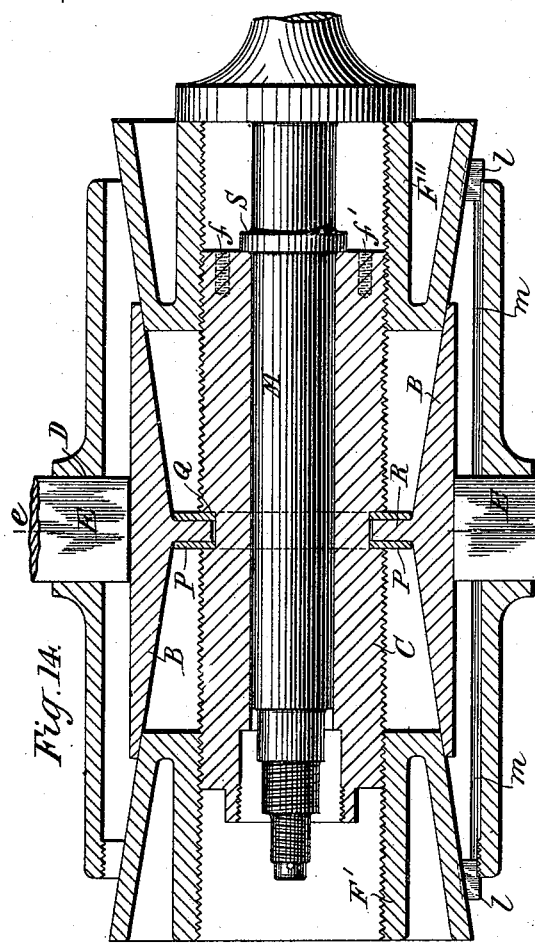
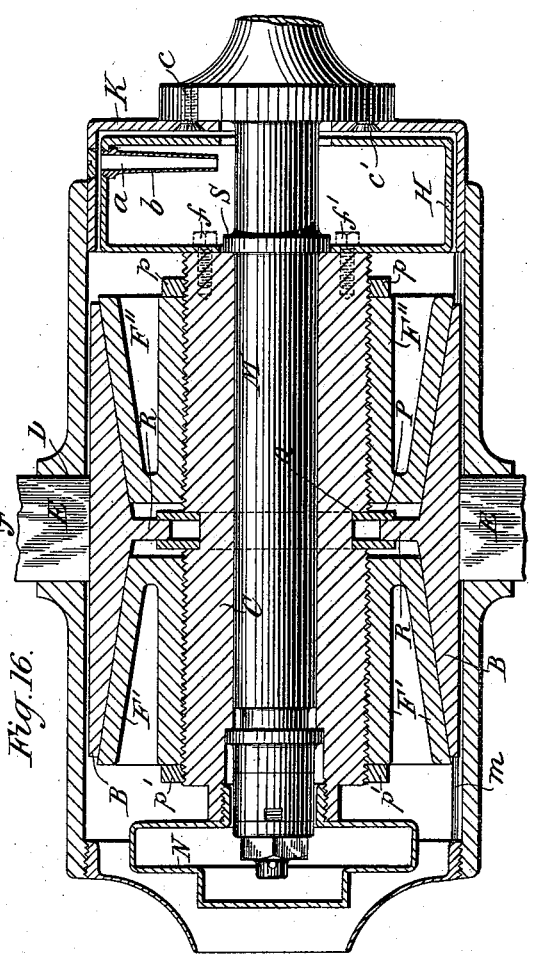
Witnesses.
D. H. Sweeney
A. Jones.
Inventor:
Harry Moore
by H. Moy Thomas
his attorney.

UNITED STATES PATENT OFFICE.

HARREY MOORE, OF WELLINGBOROUGH, ENGLAND.

VEHICLE-WHEEL.

SPECIFICATION forming part of Letters Patent No. 504,440, dated September 5, 1893.

Application filed March 15, 1892. Serial No. 424,997. (No model.) Patented in England August 17, 1891, No. 13,834.

*To all whom it may concern:*

Be it known that I, HARREY MOORE, a subject of the Queen of Great Britain, residing at Wellingborough, in the county of Northampton, England, have invented new and useful Improvements in and Relating to Wheels of Road-Vehicles, (for which I have applied for a patent in Great Britain, No. 13,834, bearing date August 17, 1891,) of which the following is a specification.

This invention relates to improvements in the construction of wheels whereby the spokes may be extended between the hub and the felly in order to obtain the necessary rigidity in the wheel; to the means of distributing oil upon the axle automatically by the rotation of the wheel, and to the special form of tire employed for the wheel.

I make and construct the wheel as shown in the accompanying drawings, in which—

Figure 11:
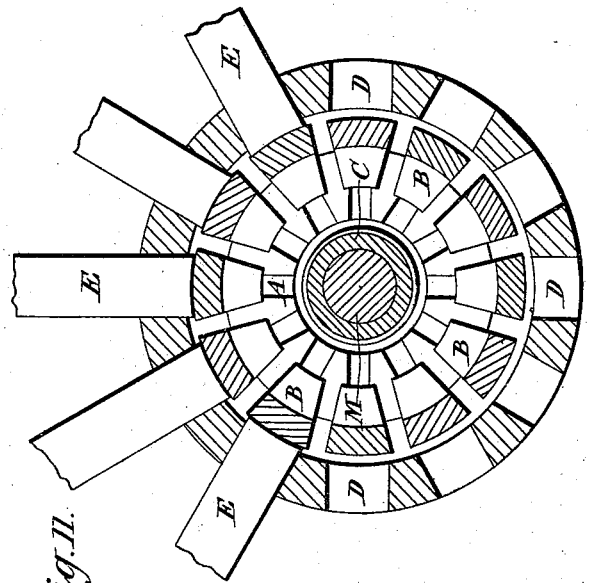
Figure 13:
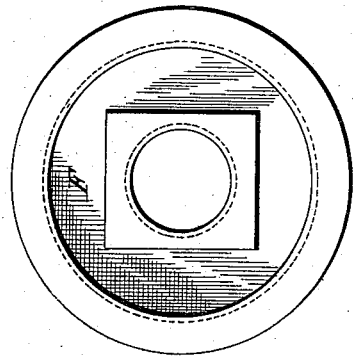
Figure 10:
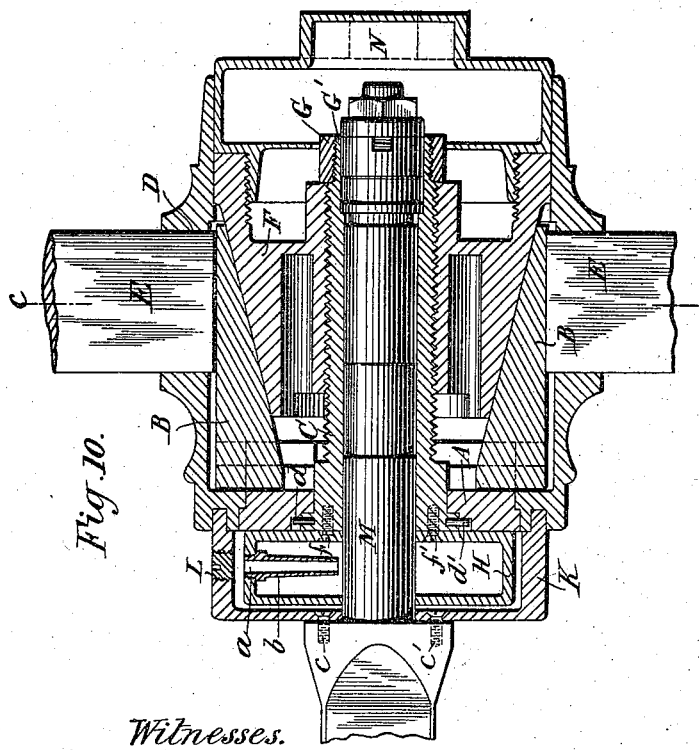
Figure 12:
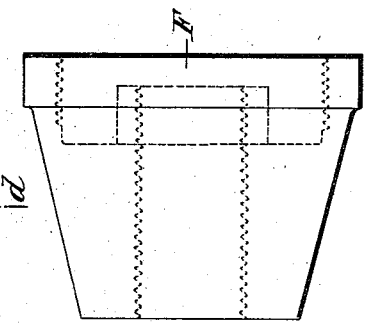

Figure 1 is a front elevation of my improved wheel. Fig. 2 is a cross section through the felly showing the form of the iron tire. Fig. 3 is a cross section through the felly showing a modification in form of the iron rim suitable for receiving an india rubber tire. Fig. 4 is a sectional view of the hub, the spoke extending mechanism being shown in its contracted form. Fig. 5 is a section taken at the line $a\,b$ in Fig. 4 showing the application of the spoke extending wedges to the spokes. Fig. 6 is an elevation of the radial mortise plate. Fig. 7 is a plan of Fig. 6. Fig. 8 is a side view and Fig. 9 is a plan of one of the spoke extending wedges. Fig. 10 is a sectional view of the hub the spoke extending mechanism being shown in its expanded form. Fig. 11 is a section taken at the line $c\,d$ in Fig. 10 showing the expansion of the spoke extending mechanism. Fig. 12 is an elevation and Fig. 13 a plan of the cone employed for the spoke extending mechanism. Fig. 14 is a sectional view of a modified form of hub employing two cones for the spoke extending mechanism which in this figure is shown in its contracted form. Fig. 15 is a section taken upon the line $e\,f$ in Fig. 14. Fig. 16 is a sectional view similar to Fig. 14 the spoke extending mechanism being shown in its expanded form and the oil box and oil cap applied thereto. Fig. 17 is a front elevation of the modified form of radial mortise plate as adapted to the spoke extending mechanism shown in Figs. 14 and 16. Fig. 18 is a side elevation of Fig. 17.

Upon the axle-box and secured thereto by the pins $d\,d'$ I provide a radial mortise plate A having a number of undercut radial grooves corresponding with the number of spokes to be put in the wheel. In these radial grooves wedge shaped bars B are secured capable of moving therein so as to close toward the center of the axle-box C until they all meet laterally forming a cylinder having a conical bore. These wedge shaped bars B together with the axle-box C are fitted into the nave of the wheel so as to bring one of these bars B to face each of the mortises D of the nave in which the spokes are fitted. Thus the wedge shaped bars B form bases upon which the spokes E rest within the nave of the wheel and as they are movable in the radial grooves of the radial mortise plate A they may be expanded by means of a cone F screwed upon the axle-box C within the nave of the wheel so as to extend the spokes from the nave toward the felly and thus put the required strain upon the wheel to obtain the required rigidity. The cone F being screwed upon the axle-box C by means of a right hand screw thread formed thereon, may be securely retained by a following nut G engaging with a left hand screw thread $G'$ formed upon that part of the axle-box C which projects beyond the cone F.

The axle-box C has at its rear end a cylindrical box H secured thereto by the screws $f\,f'$ made for receiving a store of oil admitted through an orifice in a dust proof case K closed by a screw L. This orifice may be made to correspond with a passage $a$ through a tube $b$ fixed in the oil-box H and projecting therein radially as nearly as possible to the axle M which passes centrally through the oil-box H and the axle-box C. The tubular projection $b$ serves for filling the oil-box H to about the level of the central opening therein through which the axle M passes and acts as a dipping peg passing once through the body of oil contained in the oil-box H at each revolution of the wheel and depositing upon the axle M drops of oil which drain from the dipping peg $b$ as it passes out from the oil in completing each revolution of the wheel. The oil thus deposited upon the axle finds its way along by suitable oil channels cut upon the axle M or within the axle-box C and may drip from the axle M at the outer extremity of the nave of the wheel into a hollow nut N screwed on to the cone F as shown in Figs. 4 and 10 or into the axle-box C as shown in Fig. 16. The hollow nut N forms a reservoir in which the oil after lubricating the axle is collected.

In order to protect the oil-box H from admission of dust I provide the dust proof case K secured by the screws $c$ $c'$ to the axle M and extending under cover of the nave of the wheel as shown in Fig. 16 or in an annular groove made endwise in the nave of the wheel as shown in Figs. 4 and 10. The axle-box C may be retained upon the axle M by left and right handed nuts and a cotter in the usual way. I make the tire preferably with a downwardly inclined flange $g$ at each side projecting toward the center of the wheel. The extension of the spokes thus tends to force the felly $h$ into the tapering channel which the flanged tire represents and so secures the tire upon the wheel without spikes or bolts by which ordinary tires are secured to the fellies of wheels. In case of employing an india-rubber tire I make the rim in the form shown in Fig. 3 to receive the india-rubber tire $k$.

In the case of wheels intended for heavy vehicles I make a modification in the spoke extending mechanism to provide for expanding the wedge shape bars by two cones instead of one. The modifications are shown in Figs. 14, 15, 16, 17 and 18.

The axle-box C is grooved at its center to receive the mortise plate P which is cut in two halves for placing it in the recess or groove Q. One of the cones F' has a left hand screw thread and the other F has a right hand screw thread the axle-box C being correspondingly threaded in a left hand direction at one side of the groove or recess Q and in a right hand direction at the other side. These cones F' and F'' are guided in the nave of the wheel by projections $l$ forming feathers to slide in grooves $m$ made in the nave so that the cones may be made to approach to or recede from each other without rotating, by rotating the axle-box C by means of a suitable spanner applied at $n$. The mortise plate P receives the tongues R dependent from the double ended wedge shaped bars B to keep these bars in position to bear evenly upon the spokes E which rest upon them to be extended thereby in accordance with the pressure brought to bear by entering the cones. In this case the oil-box H is applied by the screws $f$ $f'$ after expanding the spoke extending mechanism which is securely fastened by the lock nuts $p$ and $p'$. Then the wheel is put upon the axle M upon which the dust proof case has been previously fixed by the screws $c$ $c'$. The axle box C abuts against the ring or collar S to relieve the end thrust of the wheel from the oil-box H.

What I claim, and desire to secure by Letters Patent, is—

1. In a wheel the combination with the nave the spokes passing through mortises in the nave and the axle box, of a plate secured to the axle box and having radial grooves, of a series of wedges whose ends are adapted to slide in the radial grooves of the plate and whose outer surfaces bear against the inner ends of the said spokes, and of a cone adapted to be moved along the axle box and act on the inner surfaces of the wedges to force them outward radially substantially as specified.

2. In a wheel the combination with the nave the spokes passing through mortises in the nave and a screw threaded axle box, of a plate secured to the axle box and provided with radial grooves, of a series of wedges whose ends are adapted to slide radially in the said radial grooves and whose outer surfaces form portions of a cylinder parallel to the axle and adapted to form bearing surfaces for the inner ends of the spokes and whose inner surfaces form portions of a cone coaxial with the axle box, and of a cone adapted to be screwed on the axle box and to force the wedges radially outward substantially as specified.

3. In a wheel the combination with the nave, the spokes passing through the mortises in the nave and the axle box, of a plate fitting loosely on the axle box but prevented from moving axially and provided with radial mortises, of a series of double wedges which are provided with projections filling in the radial mortises and whose outer surfaces bear against the inner ends of the said spokes, and of two cones adapted to be moved or drawn together along the axle box and act on the inner surfaces of the wedges from the two ends to force them radially outward substantially as specified.

4. In a wheel the combination with the nave the spokes passing through mortises in the nave and the right and left hand screw threaded axle box, of a plate fitting loosely on the axle box but prevented from moving axially and provided with radial mortises, of a series of double wedges which are provided with projections fitting in the radial mortises and whose outer surfaces form a portion of a cylinder parallel to the axis and adapted to form bearing surfaces for the inner ends of the spokes and whose inner surfaces form portions of two reverse cones coaxial with the axle box, and of two cones adapted to screw on the right and left hand screw threads of the axle box and to be drawn together by rotating the axle box to force the wedges radially outward substantially as specified.

5. In a wheel the combination with spokes radially extensible from the hub to the felly, of wedge shaped fellies and of a double-flanged and wedge-shaped tire into which the fellies are expanded to obtain the required rigidity of the wheel substantially as specified.

HARREY MOORE.

Witnesses:
WILLIAM FISH,
ALICE FISH.